C. A. FINLEY.
VIBRATION DETECTOR.
APPLICATION FILED FEB. 23, 1918.

1,324,959.

Patented Dec. 16, 1919.

Inventor:
Charles A. Finley.
by J. G. Roberts  Atty.

UNITED STATES PATENT OFFICE.

CHARLES A. FINLEY, OF BROOKLYN, NEW YORK, ASSIGNOR TO WESTERN ELECTRIC COMPANY, INCORPORATED, OF NEW YORK, N. Y., A CORPORATION OF NEW YORK.

VIBRATION-DETECTOR.

1,324,959.     Specification of Letters Patent.     Patented Dec. 16, 1919.

Application filed February 23, 1918. Serial No. 218,784.

*To all whom it may concern:*

Be it known that I, CHARLES A. FINLEY, a citizen of the United States, residing at Brooklyn, in the county of Kings and State of New York, have invented certain new and useful Improvements in Vibration-Detectors, of which the following is a full, clear, concise, and exact description.

The invention relates to a device for detecting feeble vibrations such as are propagated under water in the form of sound waves set up by the passage of a submarine or other vessel therethrough. It is desirable to be able to detect these vibrations at a considerable distance from their source and to reproduce them without distortion at such distant point in order to enable an observer to determine not only the presence of such source, but the character, distance and direction of such source. Various methods have been proposed for determining the direction and distance of the source of vibrations, and all of these methods depend for their success on the accurate reproduction of the vibrations.

Therefore, the object of the invention is to provide a detector which will bring about the accurate reproduction of the vibrations and which will be sensitive to very feeble vibrations. The mechanical vibrations may be reproduced in the form of current variations in an electrical circuit including a telephone receiver, either by using such vibrations to vary the resistance of a circuit through the well-known microphonic effect, or the vibrations may be utilized to cause relative movements between two magnets or two condenser electrodes, and thus vary the current in the electrical circuit. Although any of these methods may be used without departing from the spirit of the invention, in the embodiment of the invention herein disclosed, the microphone effect is utilized.

The detector of this embodiment of the invention takes the form of a microphone button which is adapted to be attached to any body adapted to receive and vibrate in response to feeble vibrations such, for instance, as the side of a ship, a mine casing or buoy, or a rubber or other diaphragm.

Therefore, in accordance with a feature of the invention, a microphone is provided, one electrode of which may be fixedly secured to a sound receiving body, and the other of which is yieldingly mounted with respect to such body so as to be capable of vibration with respect thereto, such mounting serving also to damp this relative movement and to prevent distortion of the reproduction in the electrical circuit.

Figure 1:
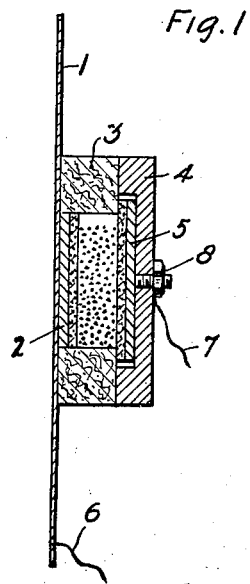
Figure 2:
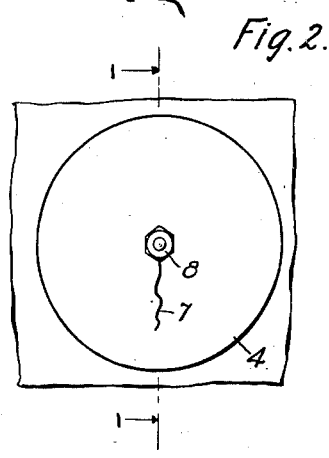

In the drawing, Figure 1 is a longitudinal section substantially on the line 1—1 of Fig. 2 of the device, and Fig. 2 is a rear elevation.

The vibration receiving body is indicated at 1. In the particular embodiment of the invention shown, this vibration-receiving body is in the form of a metal diaphragm. However, it may be any vibration-receiving body such as the side of a ship, the wall of a mine casing, or a stretched rubber diaphragm. Secured to the diaphragm 1 in any suitable manner is an electrode 2 which is provided with a carbon face. This electrode is fixedly secured to the diaphragm 1 and has no movement relative thereto. Also secured to the diaphragm 1 is a ring of felt 3 having considerable stiffness, and consequently considerable energy absorbing properties. This ring may be attached to the diaphragm by some form of cement. Supported solely by such ring of felt 3 is a member 4 which carries a back electrode 5 which is also provided with a carbon face. The diaphragm 1, the felt ring 3 and the member 4 form a cylindrical chamber which incloses the electrodes 2 and 5 and also a quantity of granular carbon. In the embodiment of the invention shown, one terminal of the electrical circuit, including the telephone receiver and a source of current, is connected to the front electrode 2 by the leading-in wire 6 soldered to the vibrating member 1, and the other side of the circuit is attached by the leading-in wire 7 to the stem 8 of the back electrode.

The operation of the device is as follows. Any vibration, such as a sound wave, impinges upon the diaphragm 1 and the diaphragm is caused to vibrate. The electrode 2 partakes of this movement. The electrode 5, however, being attached to the member 4, is given a movement independent of the diaphragm 1 due to its inertia and by virtue of the yielding support afforded by the ring of felt 3. The arrangement is extremely sensitive and the relative movement between the electrodes takes place in response to very feeble vibratory effects. However, if some means were not provided to damp the movement of the back electrode, a certain amount of distortion would be introduced, due to the over vibration of such electrode. The felt supporting ring serves to damp this over vibration as comparatively stiff felt is an energy absorbing material. The relative movement of the electrodes 2 and 5 varies the resistance of the carbon granules and hence of the electrical circuit, including a telephone, a source of potential and such granules. The effect of the vibrations of the sound-receiving body or diaphragm is thus reproduced in the telephone receiver. The device is very simple and extremely compact and it may be applied in a variety of locations. It does not involve the use of complicated damping springs with their attendant complications.

What is claimed is:

1. A device for detecting vibrations comprising a vibration responsive element, an annulus of relatively stiff energy absorbing material, an electrode supported within said annulus on said vibration responsive element and a second electrode supported on said annulus, and a resistance varying material included between said electrodes.

2. In a device for detecting vibrations, a vibration responsive element, an inertia element, and means for supporting said inertia element from said responsive element comprising a member of relatively stiff energy absorbing material, and means included between said elements for varying the characteristics of an electrical circuit.

In witness whereof, I hereunto subscribe my name this 9th day of February, A. D., 1918.

CHARLES A. FINLEY.